June 17, 1930.   H. L. KRAEFT   1,764,731
WHEEL AND BEARING CONSTRUCTION
Filed Nov. 14, 1927
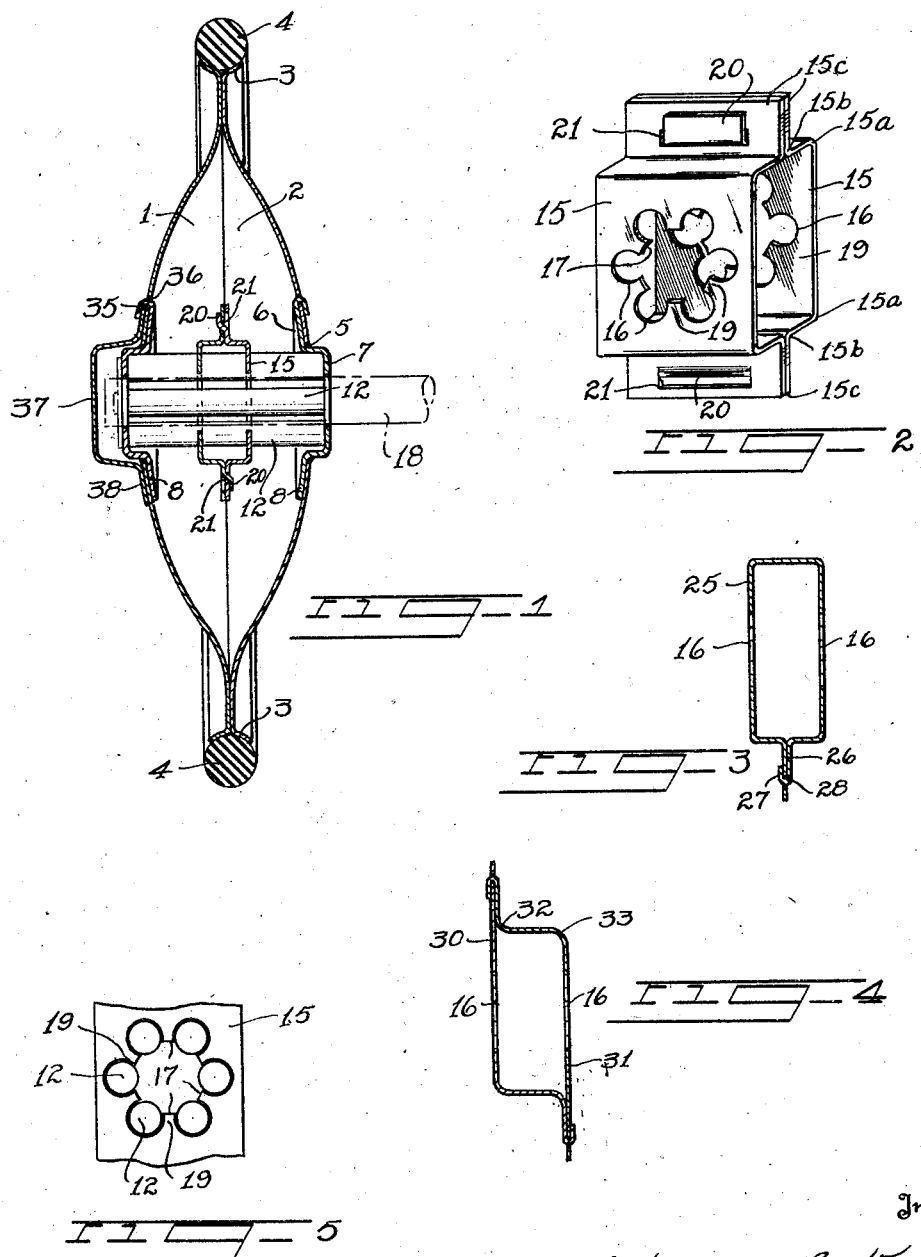

Patented June 17, 1930

1,764,731

UNITED STATES PATENT OFFICE

HERMAN L. KRAEFT, OF CLEVELAND, OHIO, ASSIGNOR TO THE MURRAY OHIO MANUFACTURING COMPANY, OF CLEVELAND, OHIO, A CORPORATION OF OHIO

WHEEL AND BEARING CONSTRUCTION

Application filed November 14, 1927. Serial No. 233,002.

The object of this invention is to provide a juvenile vehicle wheel construction which may be easily and cheaply manufactured from a minimum number of parts, and which will be rugged enough to withstand the vicissitudes of juvenile use.

A specific object is to provide a retainer for the rollers, of a roller bearing, which may be simply formed, and which will prevent skewing of the rollers while holding them in position in the hub of the wheel with the axle removed therefrom. A further object is to provide an improved arrangement for holding a hubcap onto the wheel, out of contact with the axle.

Further objects and features of the invention will become apparent from the following description relating to the accompanying drawing showing the preferred forms. The essential characteristics are summarized in the claims.

The drawing shows a wheel made up of a pair of discs spaced apart at the center to provide the proper hub length, and the hub proper is formed from a pair of pressed metal members, one adjacent each disc, which both reinforces the disc at the central portion thereof and provides an outer race for the rollers. Portions of the reinforce members are arranged to provide securing means for a cap which may be made with flat faces to simulate the nut-like hub cap of a full sized vehicle. The improved roller retainer is so arranged as to hold the rollers in spaced and parallel relation at all times, and against inward movement while permitting the rollers to travel bodily with reference to both the hub and axle. The wheel with the roller bearing and retainer constitutes a complete self-sustaining assembly prior to the time the wheel is applied to the axle.

In the drawing, Fig. 1 is a substantially central cross sectional view of the entire wheel; Fig. 2 is a perspective view of the roller retainer in its preferred form; Fig. 3 is a substantially central cross sectional view through a modified form of retainer; Fig. 4 is a similar cross sectional view through still another modified form; Fig. 5 is a fragmentary side elevation of the retainer showing the relation of the rollers thereto.

The two discs are indicated at 1 and 2 and comprise pressed sheet metal plates dished at their central portions and suitably formed at their outer edges to provide oppositely disposed flanges 3 forming a peripheral channel for the reception of a rubber tire 4. At the center of each disc is an opening 5. Seated in these openings are cup-shaped portions 7 of pressed metal, hub forming members 6, the cup-shaped portions serving as outer races for rollers, as will be presently understood. Extending outwardly from the cup-shaped portions and within the wheel structure are flanges 8, which lie against the respective discs 1 and 2 to which they may be rigidly secured.

The discs 1 and 2 may be suitably fastened together near the outwardly extending flanges 3, as by riveting or welding, so that the hub members 6 are rigid with each other through the agency of the discs.

The rollers 12, plain cylinders as shown, are held in proper relation by spaced, but mutually rigid, plates 15 with stamped out circular recesses 16 slightly larger than the rollers and forming radial extensions of larger registering openings 17 which allow the axle 18 to pass through the retainer plates in the embrace of the rollers. The cup-like portions 19, resulting from the foliate contour of the openings, and connecting recesses, extend inwardly far enough to retain the rollers against inward movement, but not far enough to contact with the axle. The ends of the rollers rest lightly in the cupped portions of the members 6.

The plates 15 comprise sheet metal strips and may be made mutually rigid by bringing the ends toward each other, as by bending the strips at 15$^a$ and again at 15$^b$ to produce overlying flanges as at 15$^c$. The flanges may be secured together as by means of stamped out lugs 20 which enter registering openings 21. In order to make the plates identical, to reduce die cost, each plate has a lug on one end and an opening on the other. Thus, only one pattern of stamping is necessary, two stampings comprising a complete retainer.

It will be understood that with the axle in position the rollers are borne into rolling contact with the internal race surfaces of the members 6. As the wheel turns on the axle the retainer plates are free to move with the rollers so as not to retard their free movement, and, because of the mutual rigidity of the plates, the rollers are maintained parallel. This will prevent any binding action which would otherwise result should the shaft be somewhat undersize and the rollers consequently free to move out of parallelism.

A modification is shown in Fig. 3 wherein the retainer plates are made of a single strip 25 doubled on itself, the ends of the strip being brought together as at 26 and held by a lug 27 on one end, entering an opening 28 on the other end. The shaft opening and roller receiving recesses are designated as before.

The modification shown in Fig. 4 is a two piece arrangement somewhat similar to Fig. 2, but made in such manner that there are fewer bending operations on the stock. The strips are designated 30 and 31. Whereas, there are four bends for each strip, in the arrangement shown in Fig. 2 there are only two bends for each strip in the arrangement shown in Fig. 4. These bends are at right angles as shown and are indicated at 32 and 33. The same lug and registering opening arrangement may be used to hold the strips together, as illustrated.

To hold the hub cap in place, I preferably provide spurs or lugs 35 at the outer periphery of one of the members 6, which lugs extend through registering openings 36 in the adjacent disc. The hub cap comprises a cup-shaped member 37 having an outwardly extending flange 38 terminating closely adjacent the openings 36, and the lugs hold the cap by reason of being bent down over the edges of the cap flange, as shown. This arrangement for holding the hub cap is preferred partly because the metal of the hub forming members is and should be thicker than the metal of the discs, hence, the lugs holding the cap are stronger than as though made by punching out lugs from the metal of the wheel disc, according to previous practice. A further advantage of the arrangement is that the wheel may be cheapened by using legs on the members 6 to hold these members and the discs together, thereby doing away with the necessity for a spot welding or riveting operation.

I claim:

1. In a wheel having hub forming means providing spaced bearing surfaces, and having a plurality of rollers with the ends thereof respectively engaging said surfaces, a plurality of spaced apart mutually rigid substantially flat sheet metal plates carried loosely on the rollers and having portions extending radially materially beyond all the rollers in a common plane and then bent toward each other, said plates having portions thereof stamped out to provide through openings for receiving an axle and the rollers, said opening being foliate in contour to provide projections between the rollers for spacing the same and to prevent inward movement thereof when disengaged from the axle.

2. In a wheel having a hub structure including spaced outer roller bearing races, and a plurality of rollers adapted to contact therewith, retainer means positioned loosely between the said races for holding the rollers in spaced parallel arrangement, comprising rigidly joined flat sheet metal strip members including parallel spaced portions having registering openings punched therethrough to receive a shaft and embrace the rollers, the roller embracing portions of the openings providing projections extending inwardly materially past the centers of adjacent rollers to hold the rollers against inward movement.

3. In a wheel having a hub structure including spaced bearing supporting surfaces and a series of rollers with their ends respectively engaging said surfaces, a retaining device for the rollers comprising substantially flat strips having portions in spaced substantially parallel relation said portions having through openings for receiving an axle and recesses leading outwardly from said openings to receive and retain the rollers, an end portion of one of the plates being bent out of the plane of the roller-retaining portion and joined to the end portion of the other in superposed relation thereto.

4. In a wheel having hub forming means including spaced outer roller bearing races and a plurality of rollers adapted to contact therewith, retainer means to hold the rollers in spaced parallel arrangement comprising, a pair of sheet metal strips spaced longitudinally of the rollers, and each having an opening therethrough to receive a shaft and embrace the rollers, the roller embracing portions of the openings providing projections extending inwardly and underhanging adjacent rollers to hold the rollers against inward movement, one end of each strip being bent out of the plane of the roller embracing portion toward the other strip to join the two strips, one end of each strip having an upstruck lug and the other end of each strip having an opening in corresponding position, whereby the strips may be identical in form and may be locked together by the mutual engagement of such lugs and openings.

In testimony whereof, I hereunto affix my signature.

HERMAN L. KRAEFT.